US012173872B2

(12) United States Patent
Sinphay et al.

(10) Patent No.: US 12,173,872 B2
(45) Date of Patent: *Dec. 24, 2024

(54) SLOPED CEILING ADJUSTABLE LIGHT FIXTURE

(71) Applicant: Progress Lighting, LLC, Greenville, SC (US)

(72) Inventors: Anthony Phonexay Sinphay, Simpsonville, SC (US); Dhavalkumar Prabhudas Patel, Greer, SC (US); William Buck Thomas, Greenville, SC (US)

(73) Assignee: Progress Lighting, LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,626

(22) Filed: Oct. 4, 2023

(65) Prior Publication Data

US 2024/0027059 A1 Jan. 25, 2024

Related U.S. Application Data

(63) Continuation of application No. 17/318,536, filed on May 12, 2021, now Pat. No. 11,808,440.

(60) Provisional application No. 63/024,192, filed on May 13, 2020.

(51) Int. Cl.
*F21V 21/30* (2006.01)
*F21S 8/02* (2006.01)

(52) U.S. Cl.
CPC .............. *F21V 21/30* (2013.01); *F21S 8/026* (2013.01)

(58) Field of Classification Search
CPC .......... F21V 19/02; F21V 17/02; F21V 14/02; F21V 21/30; F21V 21/14; F21V 21/02; F21V 21/04; F21V 21/34; F21V 21/26; B60Q 1/04; F21S 8/026; F21S 8/02; F21S 8/00
See application file for complete search history.

(56) References Cited

U.S. PATENT DOCUMENTS

| | | | |
|---|---|---|---|
| 6,234,644 B1 | 5/2001 | Kotovsky et al. | |
| 6,431,515 B1 | 8/2002 | Gampe et al. | |
| 11,808,440 B2 * | 11/2023 | Sinphay | F21V 21/30 |
| 2003/0161153 A1 | 8/2003 | Patti | |
| 2006/0250788 A1 | 11/2006 | Hodge et al. | |
| 2016/0265757 A1 | 9/2016 | Hsieh et al. | |
| 2016/0320028 A1 | 11/2016 | Paulsel | |
| 2020/0116340 A1 | 4/2020 | Nikooyan et al. | |
| 2021/0108768 A1 | 4/2021 | Hou et al. | |

OTHER PUBLICATIONS

International Search Report and Written Opinion issued on Sep. 7, 2021, by the International Searching Authority in corresponding International Patent Application No. PCT/US2021/031970. (8 pages).

* cited by examiner

*Primary Examiner* — Anne M Hines
*Assistant Examiner* — Jose M Diaz
(74) *Attorney, Agent, or Firm* — McDermott Will & Emery LLP

(57) ABSTRACT

An adjustable light fixture includes a frame configured to connect to a support. A lamp assembly is connected to the frame. The lamp assembly includes a housing, a light emitter connected to the housing, and a lens connected to the housing. The lamp assembly is rotatably connected to the frame about an axis offset from an axis of the frame.

20 Claims, 12 Drawing Sheets

FIG. 4
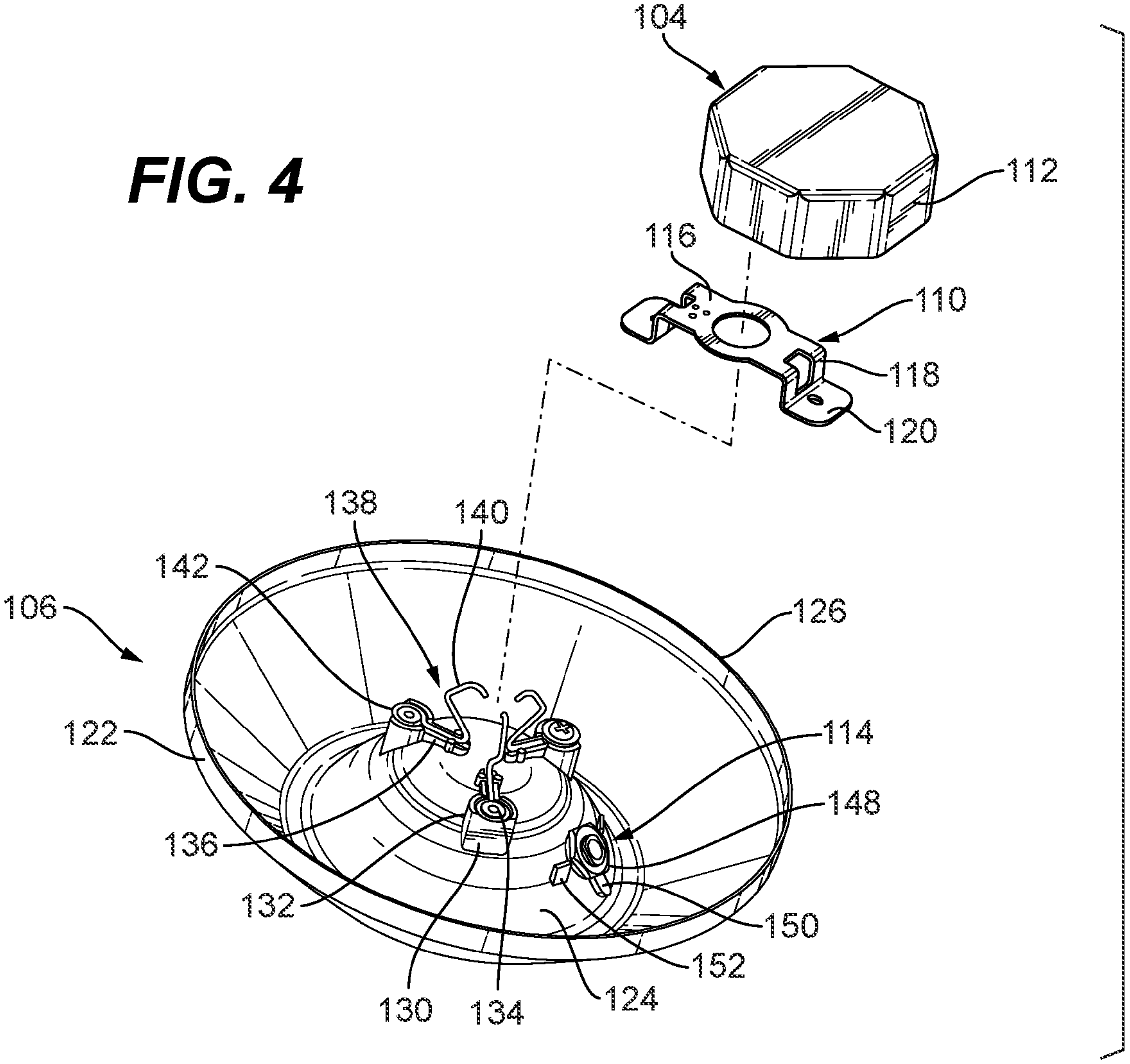
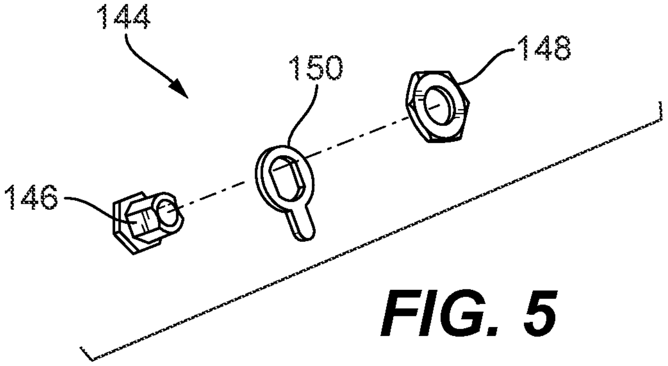
FIG. 5

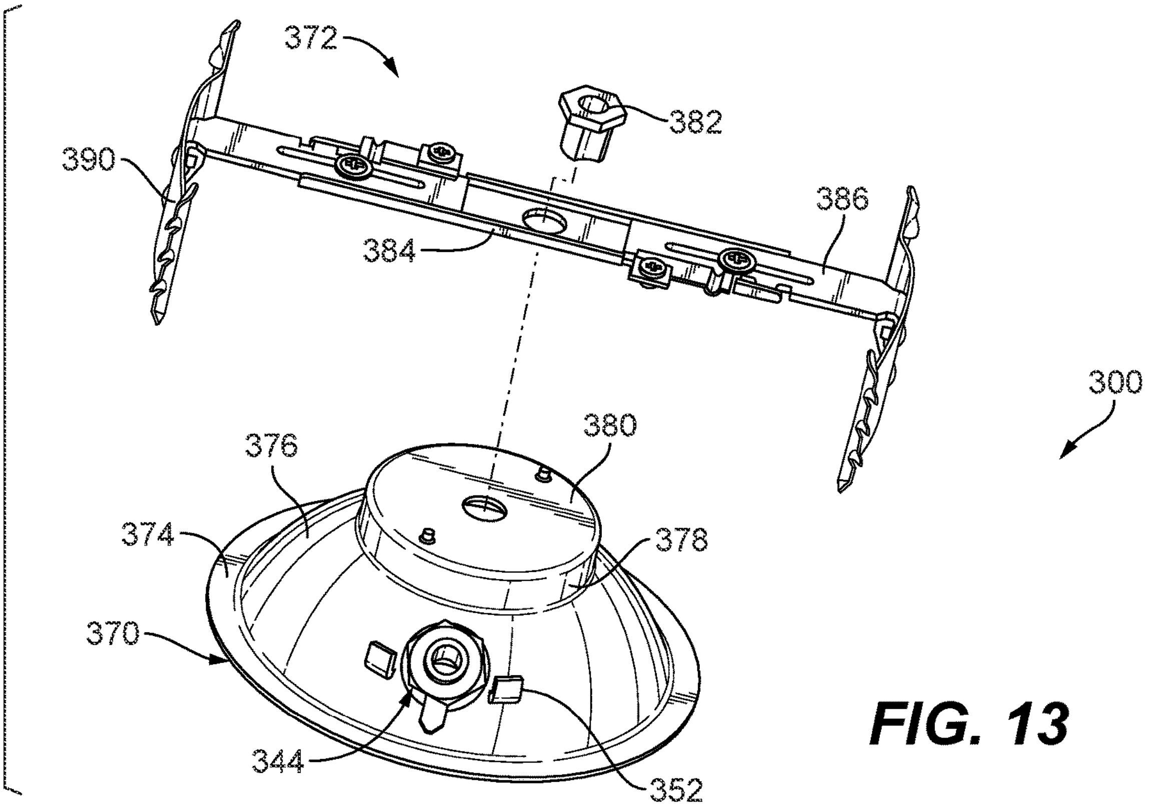
FIG. 13
FIG. 14
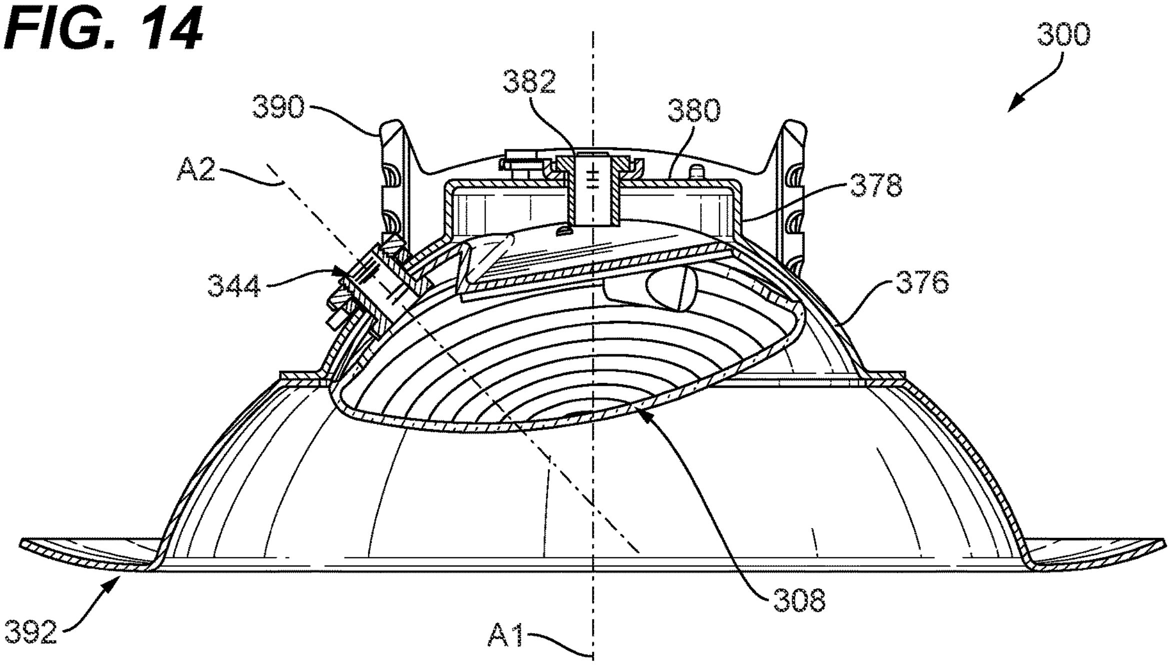

SLOPED CEILING ADJUSTABLE LIGHT FIXTURE

CROSS-REFERENCE TO RELATED APPLICATIONS

This application is a Continuation of U.S. Non Provisional application Ser. No. 17/318,536, filed May 12, 2021, which claims the benefit of U.S. Provisional Application No. 63/024,192, filed May 13, 2020, which are incorporated by reference herein in their entirety.

FIELD

Various aspects relate to an adjustable light fixture, for example, used for sloped ceiling applications.

BACKGROUND

Ceiling mounted lighting fixtures such as recessed lights or downlights are popular in homes and businesses. One reason for the increased use of these light fixtures is that they can meet a wide range of interior lighting requirements since they are not only functional, but also aesthetically pleasing. Currently, there are many manufacturers of recessed lighting fixtures and numerous designs available for mounting recessed lighting fixtures in a ceiling.

In most applications, it is typically desirable to have the lamp of a recessed lighting fixture arranged substantially perpendicular to the floor, whether it is installed in a horizontal ceiling or a sloped ceiling. Accordingly, the most common recessed lighting fixtures are typically constructed for a particular ceiling slope so that the lamp is arranged substantially perpendicular to the floor.

SUMMARY

According to certain embodiments an adjustable light fixture includes a frame configured to connect to a support. A lamp assembly is connected to the frame. The lamp assembly includes a housing, a light emitter connected to the housing, and a lens connected to the housing. The frame is configured to be rotatably connected to the support about a first axis and the lamp assembly is rotatably connected to the frame about a second axis offset from the first axis.

According to certain embodiments an adjustable light fixture includes a frame configured to connect to a support. A mounting hanger is connected to the frame and extending away frame. The mounting hanger is configured to connect the frame to the support about a first axis. A lamp assembly is connected to the frame. The lamp assembly includes a housing, a light emitter connected to the housing, and a lens connected to the housing. The lamp assembly is rotatably connected to the frame about a second axis offset from the first axis.

According to certain embodiments, an adjustable light fixture includes a frame configured to be positioned adjacent an opening in a support. The opening has a first axis. A lamp assembly is connected to the frame. The lamp assembly includes a housing, a light emitter connected to the housing, and a lens connected to the housing. A pivot rotatably connects the lamp assembly to the frame. The lamp assembly is rotatable about a second axis offset from the first axis.

BRIEF DESCRIPTION OF THE DRAWINGS

The aspects and features of various exemplary embodiments will be more apparent from the description of those exemplary embodiments taken with reference to the accompanying drawings.

FIG. 4 is a partial exploded view of the frame, mounting bracket, and junction box.

FIG. 5 is a perspective view of the pivot and indicator.

FIG. 13 is a partial exploded view of the frame and mounting hanger.

FIG. 14 is a sectional end view of FIG. 11.

DETAILED DESCRIPTION OF EXEMPLARY EMBODIMENTS

Figure 1:
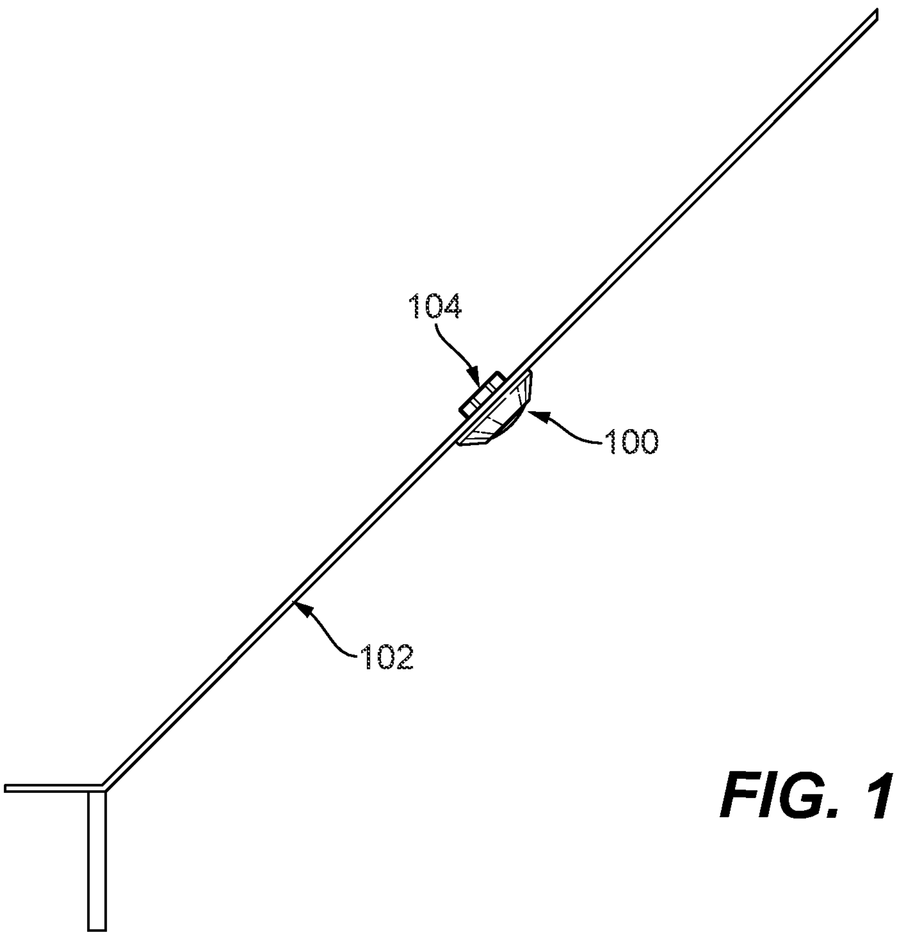
FIG. 1 is a schematic view of an exemplary light fixture positioned in a sloped ceiling.

FIG. 1 shows an exemplary embodiment of a light fixture 100 positioned in a support surface 102. The light fixture 100 is positioned on a first side of the support surface 102 and is connected to a junction box 104 that extends from a second side of the support surface 102. The junction box 104 can be positioned entirely or partially on the second side of the support surface 102. The support surface 102 is shown as a sloped ceiling that extends at an oblique angle (e.g., an acute angle) to a lighted area (e.g., a room). The light fixture 100 includes a frame 106 and an adjustable lamp assembly 108 that allows light to be directed at different angles relative to the support surface 102. For example, the lamp assembly 108 can be adjusted so that it emits light perpendicular to the lighted area. The position of the frame 106 and the lamp assembly 108 can be adjusted to accommodate different angle slopes in the support surface 102. Although designed for sloped ceiling applications, the light fixture 100 can be used in any sloped and non-sloped support surface (e.g., walls, floors, etc.) where directional light is desired.

Figure 2:
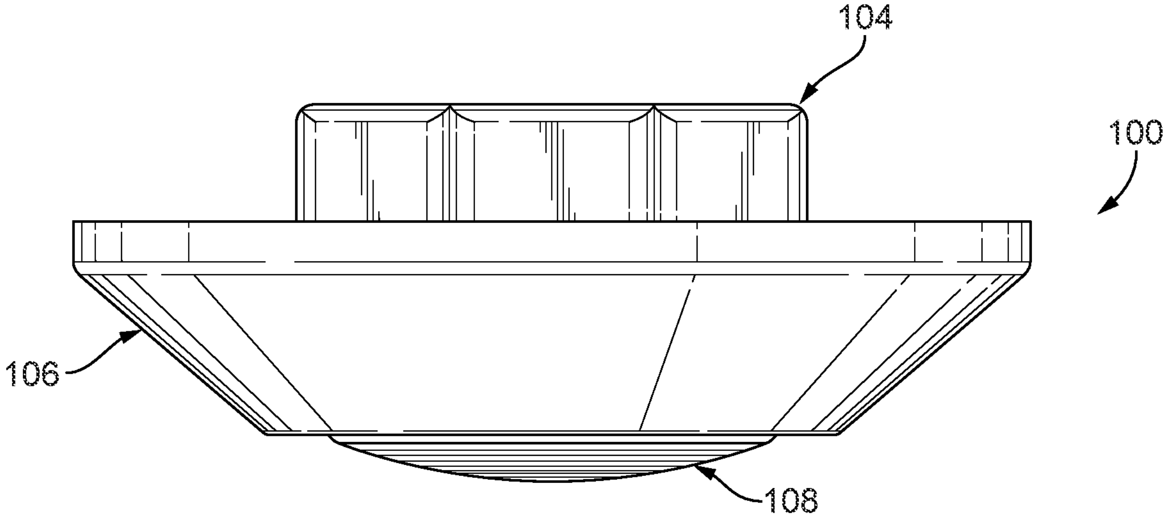
FIG. 2 is a side view of an exemplary light fixture.
Figure 3:
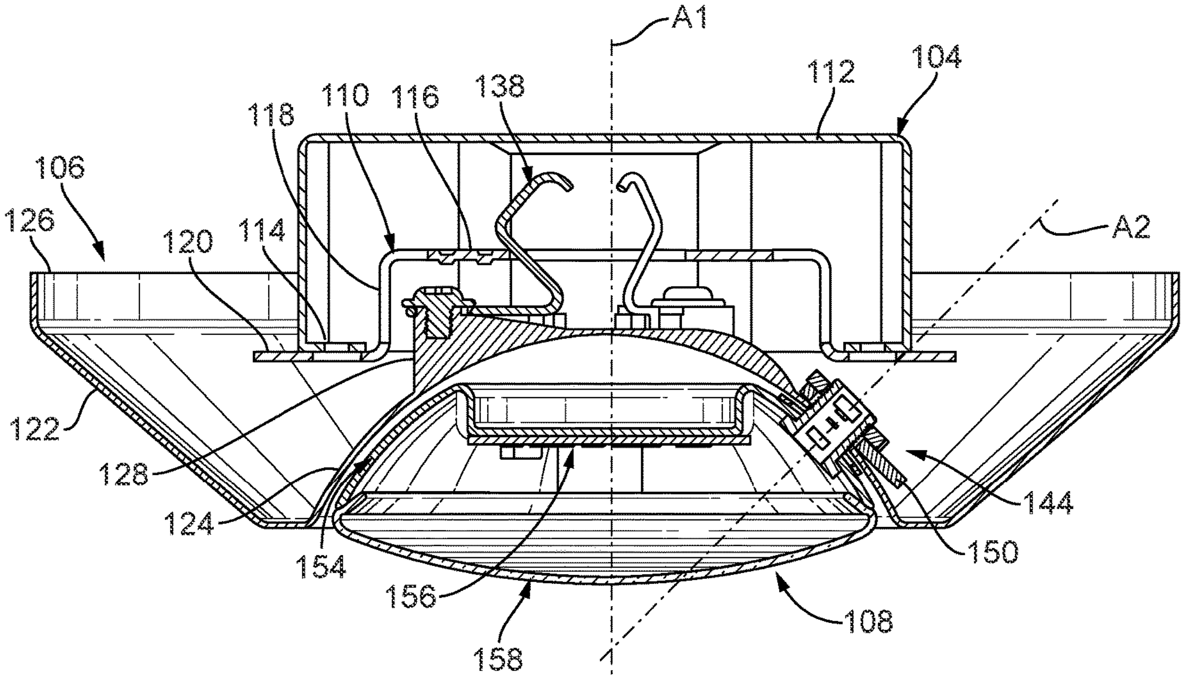
FIG. 3 is a sectional view of FIG. 2.

FIGS. 2-4 show an example of the junction box 104 and the light fixture 100. The light fixture 100 includes a frame 106 and a lamp assembly 108. The junction box 104 can be any standard size and configuration. A mounting bracket 110 connects the light fixture 100 to the junction box 104. The mounting bracket 110 can be included with the light fixture 100 or be provided as a separate element. The junction box 104 has an outer wall 112 and one or more flanges 114 extending from the outer wall 112 toward the interior of the junction box 104. The flanges 114 can include openings that are configured to receive a fastener. An electrical connection (not shown) can be made inside of the junction box 104 to connect the lamp assembly 108 to main power supply.

In some aspects, the mounting bracket 110 includes a U-shaped body having a central wall 116 and a pair of side walls 118, as best shown in FIGS. 3 and 4. A central opening is formed in the central wall 116. Side flanges 120 extend from the side walls 118. The said flanges 120 include openings that are configured to align with the openings in the junction box flanges 114. These openings can receive fasteners to connect the mounting bracket 110 to the junction box 104. The frame 106 is then releasably connected to the bracket 110. When installed, the central wall 116 and the side walls 118 of the mounting bracket 110 can extend into the junction box 104. In certain embodiments, the central wall 116 of the mounting bracket can be positioned past the frame 106 relative to the support surface 102. Aspects of these configurations allow for a lower profile light fixture 100.

The frame 106 includes an outer wall 122 that extends around an inner wall 124. The illustrated example shows a continuous, circumferential outer wall 122, although other configurations (i.e., sizes, shapes, designs, etc.) can be used. The outer wall 122 includes an upper edge 126, for example a circumferential edge. The outer wall 122 can be configured so that that the upper edge 126 engages or is adjacent the support surface 102 when installed.

The inner wall 124 can include a curved interior and exterior that defines an interior cavity for receiving the lamp assembly 108. The interior cavity can have a hemi-spherical shape to allow for adjustment of the lamp assembly 108, although other configurations can be used. The lamp assembly 108 is shown as spaced from the inner wall 124, although some configurations can include engagement where the inner wall 124 acts as a bearing surface.

One or more mounting supports 128 extend from the inner wall 124 away from the lamp assembly 108. Three mounting supports 128 are shown, although more or fewer mounting supports 128 can be used. In some aspects, a single continuous mounting support 128 with one or more openings can be used. As best shown in FIG. 3, when installed, the mounting supports can extend into the junction box 104.

As best shown in FIG. 4, the mounting supports 128 include cylindrical bosses 130 that extend from the curved exterior of the inner wall 124. The bosses 130 can be surround by side walls 132 and include a projection 134 that combine to form a circular recessed rim. A ramp 136 can extend from the bosses 130 toward the center of the frame 106, having raised walls to define a recessed channel.

The mounting supports 128 can receive one or more mounting hangers 138 that are configured to connect the frame 106 to the mounting bracket 110. In certain aspects, the mounting hangers 138 include resilient hooks. The hooks can have a substantially S-shaped portion 140 that extends from the mounting supports 128. An eyelet 142 or other opening can extend from the S-shaped portion 140. The eyelet 142 is positioned around the projection 134 in the bosses and the S-shaped portion 140 is positioned partially in the ramp and extends upwardly away from the frame 106. The hooks are resilient so that they can be squeezed toward one another and inserted through the central opening in the mounting bracket 110. The outer corner of the S-shaped portion 140 can engage the mounting bracket 110 with the top portion extending through the central opening and further into the junction box 104.

The mounting hangers 138 form a moveable connection between the frame 106 and the mounting bracket 110, and thus the junction box 104. Through this connection, the frame 106 is rotatably connected relative to the mounting bracket 110 and the junction box 104. This connection allows the frame 106 and the lamp assembly 108 to be rotated together 360 degrees relative to the junction box 104 about a first axis A1. The first axis A1 can be defined by the rotation of the frame 106, a point on the junction box 104, by extending through the opening in the support, or by the intended direction of light emitter at a zero orientation. Other rotatable connections can also be used as would be understood by one of ordinary skill in the art.

An opening can be provided in the side of the inner wall 124. The opening receives a pivot 144 that rotatably connects the lamp assembly 108 to the frame 106. In some embodiments, the pivot 108 is a fastener assembly that includes a hollow bolt 146 having a head positioned in the lamp assembly 108 and a nut 148 that is connected on the outside of the inner wall 124 (e.g. between the inner wall 124 and the outer wall 122 of the frame 106) as best shown in FIGS. 3-5. The nut 148 fastens the bolt 146 in place, and secures the lamp assembly 108 to the frame 106.

The lamp assembly 108 can rotate with the bolt 146, for example about a second axis A2 that is defined by the pivot 144 and the opening in the inner wall 124. In some embodiments, the lamp assembly 108 can rotate relative to the pivot 144. The second axis A2 is offset from the first axis A1. For example, the second axis A2 is positioned at an angle to the first axis A1. In the illustrated embodiment, the second axis A2 is offset from the first axis A1 by approximately 45 degrees. Other angles between 0 and 90 degrees can also be used, for example between approximately 15 and 75 degrees or between approximately 30 and 60 degrees.

As best shown in FIGS. 4 and 5, an indicator 150 can be positioned on the pivot 144 that rotates with the lamp assembly 108. For example, the bolt 146 and the indicator 150 can include flattened side walls that act as a keyed portion to key the indicator 150 to the bolt 146. A pair of stops 152 can be formed on the inner wall 124 to limit rotation of the indicator 150 and thus limit rotation of the bolt 146 and lamp assembly 108. The stops 152 can be formed as projections (e.g., tabs) extending from the inner wall 124 of the frame 106. The stops 152 can be positioned to limit rotation in a range of angles. For example, the stops 152 can be positioned to limit rotation approximately 45 degrees in a first direction and 45 degrees in a second direction. In another example, the stops 152 can be positioned to limit rotation approximately 90 degrees in a first direction and 90 degrees in a second direction. While any angle of rotation can be provided, typically greater than approximately 10 degrees and less than approximately 180 degrees is a desirable, workable range. Markings or other indicators can be provided on the inner wall 124 to allow a user to accurately set the position of the indicator 150.

Figure 6:
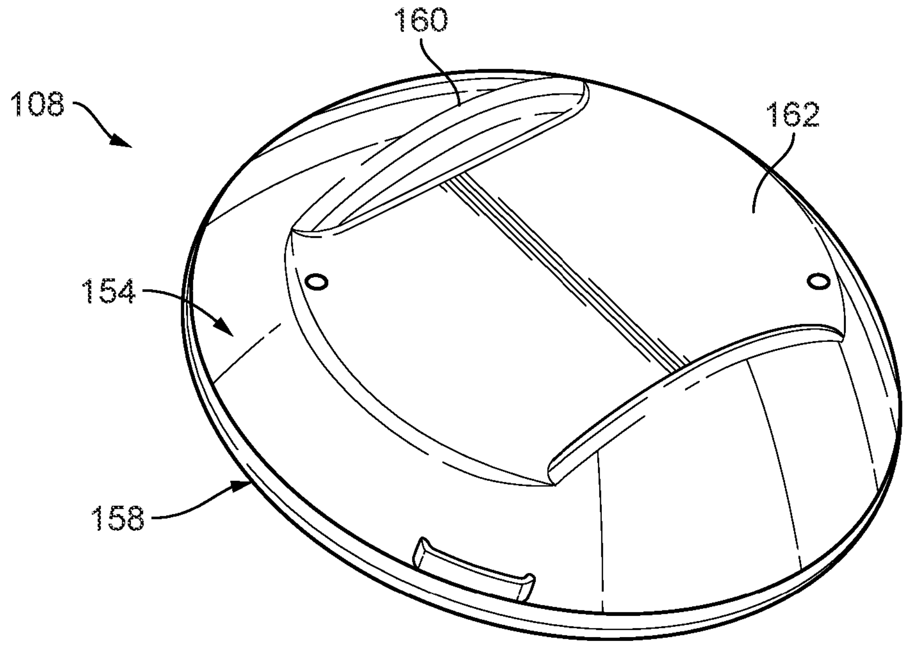
FIG. 6 is a perspective view of the lamp assembly.
Figure 7:
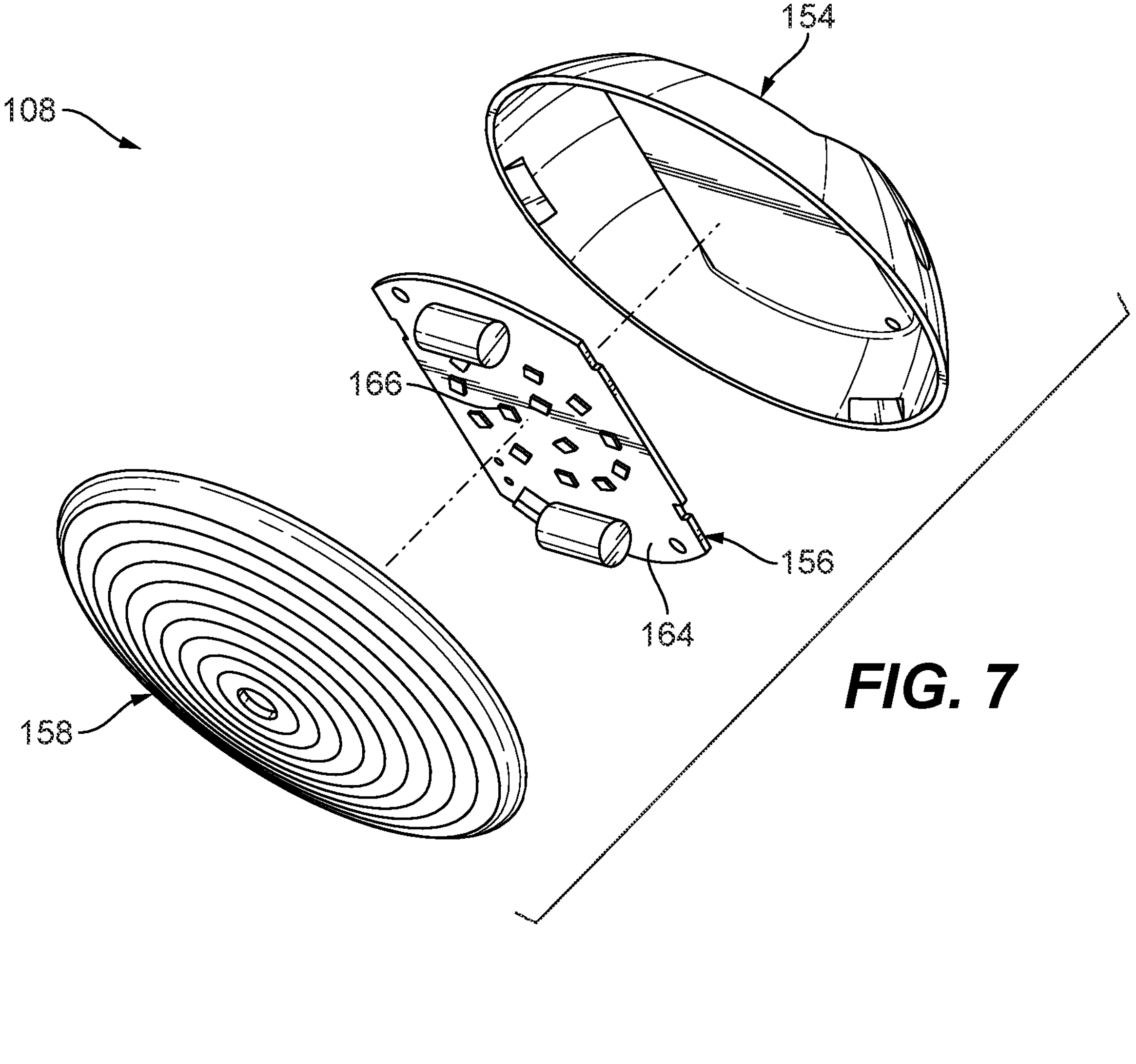
FIG. 7 is an exploded view of the lamp assembly.

FIGS. 6 and 7 show an exemplary embodiment of the lamp assembly 108. The lamp assembly 108 includes a housing 154, a light emitter 156 positioned in the housing 154, and a lens 158 connected to the housing 154. The housing 154 has a substantially hemi-spherical configuration with a bottom opening and rounded upper edges 160. A flattened central region 162 is provided for receiving the light emitter 156. An opening is positioned on one side of the housing 154 for receiving the pivot 144. For example the pivot bolt 146 can extend through the opening, with the head of the bolt 146 positioned in the housing interior. The sides of the opening can be keyed to the pivot bolt 146, so that the housing 154 is rotatably fixed to the pivot bolt 146.

The light emitter 156 can include a PCB 164 and a plurality LEDs 166 connected to the PCB 164. The PCB 164 can also include an integrated circuit that acts as a driver (e.g. driver on board or DOB IC), so that the PCB 164 can be directly connected to an AC power supply without going through a separate driver. Other embodiments can utilize drivers positioned in the lamp assembly 108, frame 106, junction box 104, or other separate location or also driver-less applications of light emitters. The pivot bolt 146 can include a hollow shaft so that one or more conductors can extend through the pivot assembly 144 and into the lamp assembly 108 housing 154 to be connected to the light emitter 156. Standard strand conductors can be used as well as different types of quick connectors (e.g., male/female plugs, threaded, etc). The LEDs 166 are positioned in an array on the PCB 164 to emit light out of the opening in the housing 154 toward the lens 158. The lens 158 can include various optical features as required for the desired final light output. The lens 158 can be releasably connected to the housing 154 (e.g., threaded, snap-fit, etc.) so that different lens configurations can be utilized with a common housing 154.

Figure 8:
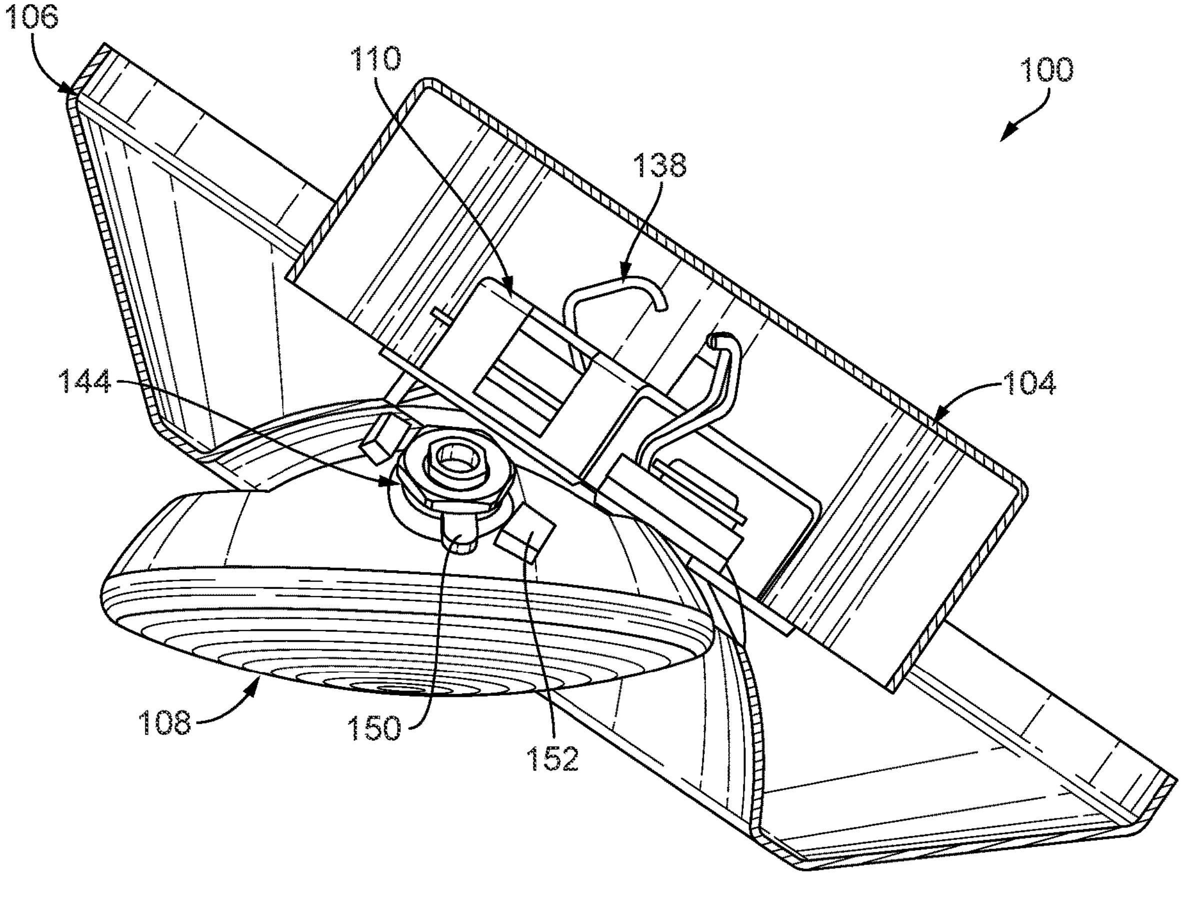
FIG. 8 is a side view of the light fixture with the junction box and frame transparent.

FIG. 8 shows an example of the lamp assembly 108 in a rotated position. During installation, an opening can be made in a support surface 102, such as a sloped ceiling. The junction box 104 can be installed relative to the opening and one or more power supply conductors can be run into the junction box 104. The mounting bracket 110 can then be connected to the junction box 104. The light fixture 100 can then be positioned near the junction box 104 and mounting bracket 110. An electrical connection can be made between the power supply conductors and the lamp assembly 108. For example, wires connected to the light emitter 156 can be spliced or a connector can be attached. The light fixture 100 can then be secured to the mounting bracket 110 by pushing the mounting hangers 138 through the central opening in the mounting bracket 110. The lamp assembly 108 can then be rotated to a desired angle for a desired directional light output.

Figure 9:
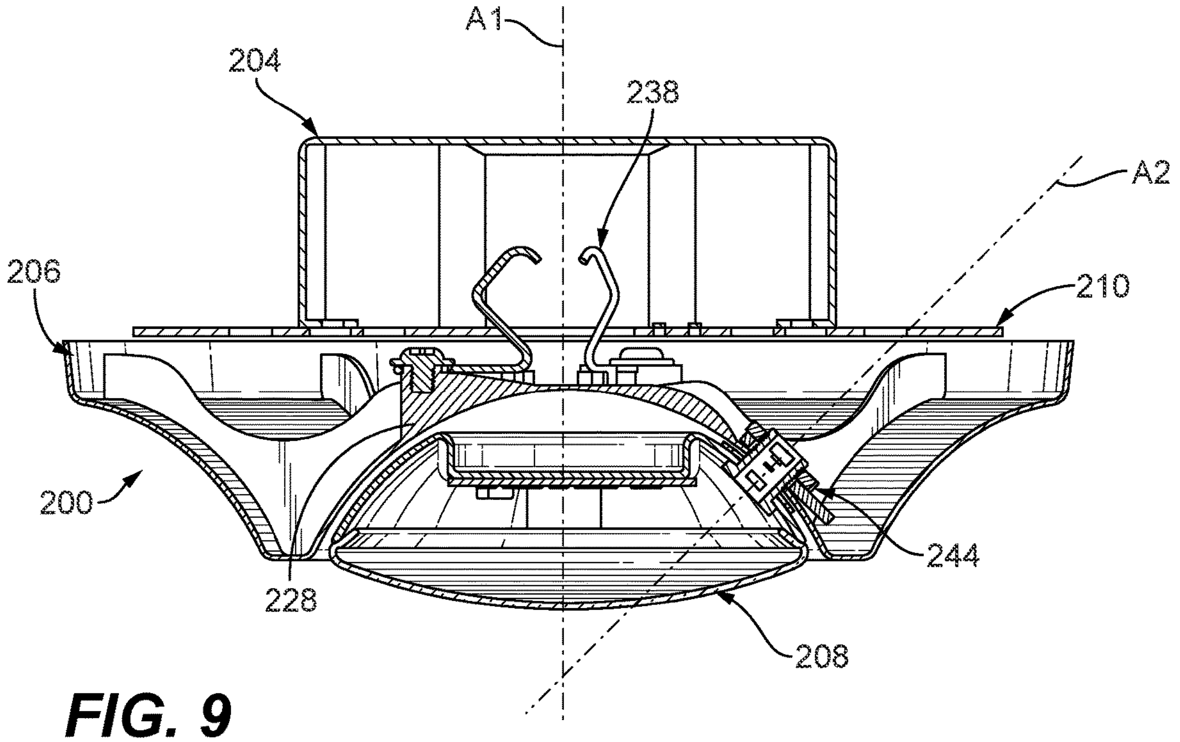
FIG. 9 is a sectional view of another exemplary light fixture.
Figure 10:
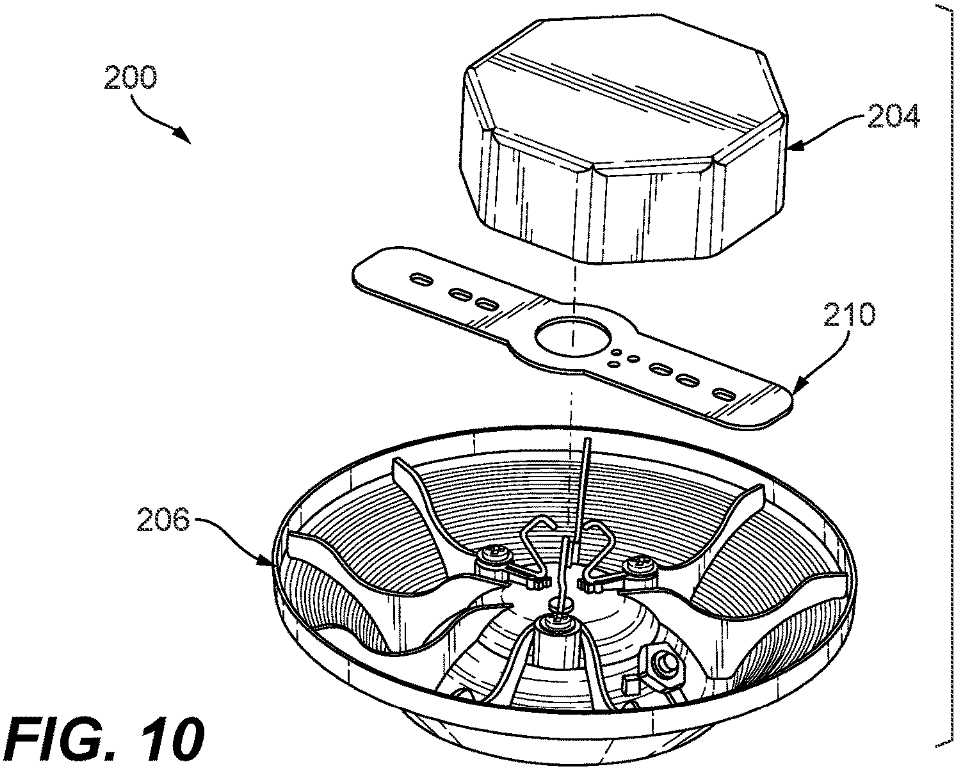
FIG. 10 is a perspective, partial exploded view of FIG. 9.
Figure 11:
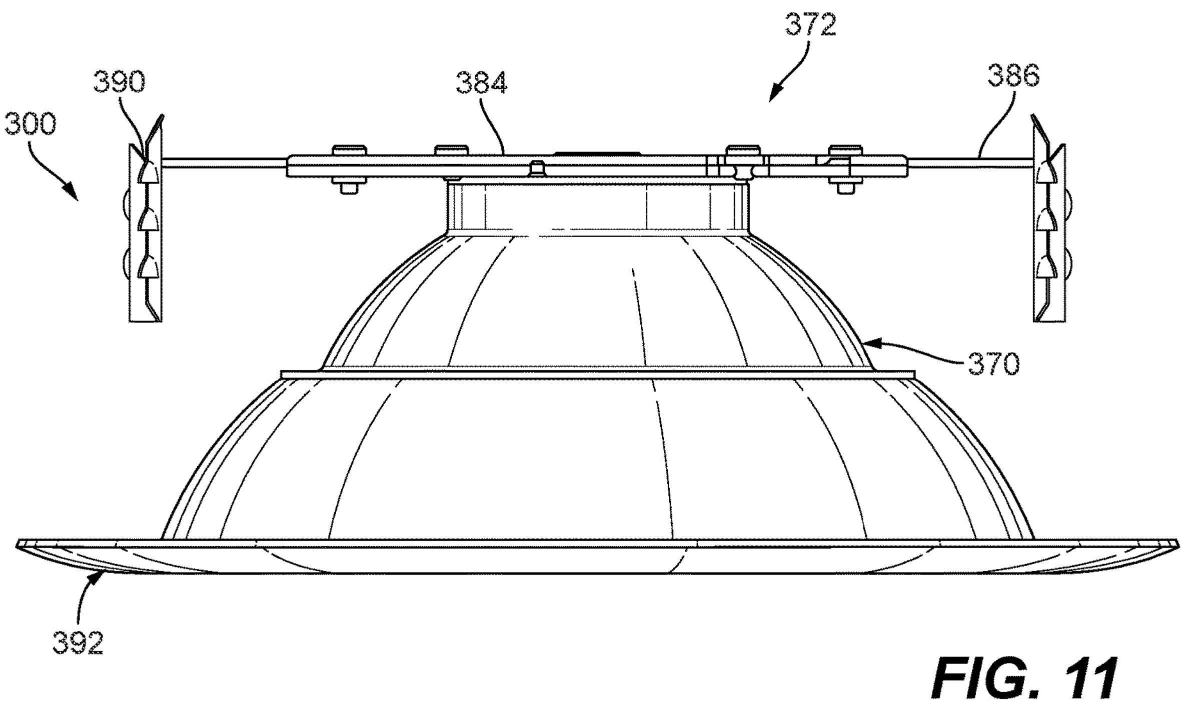
FIG. 11 is a side view of a recessed light fixture.

FIGS. 9 and 10 show another embodiment of an adjustable light fixture 200. The light fixture 200 shares a number of similar components with the light fixture 100 shown in FIGS. 1-8, with like reference numbers provided in the 200 series. The light fixture 200 includes a substantially flat mounting bracket 210 having a central opening and a series of outer openings. The flat mounting bracket 210 lowers the position of the frame 206 relative to the junction box 204 as best shown in FIG. 9.

FIGS. 11-14 show another embodiment of an adjustable light fixture 300 incorporated into a recessed housing. The light fixture 300 shares a number of similar components with the light fixture shown in FIGS. 1-8, with like reference numbers provided in the 300 series. The light fixture 300 incorporates a similar or identical lamp assembly 308, but utilizes a recessed frame 370 and a hanger assembly 372.

The recessed frame 370 includes a bottom flange 374, a spherical lower wall 376, a cylindrical upper wall 378, and a top wall 380. An opening is provided in the lower wall 376 to receive the pivot 344. Stops 352 are positioned on either side of the opening to limit rotation of the lamp assembly 308.

An opening is provided in the top wall 380 that receives a fastener 382 to connect the frame 370 to the hanger assembly 372. The fastener 382 can include a hollow bolt that allows one or more conductors to extend through the opening and the fastener to connect the lamp assembly 308 to a power source. The frame 370 is rotatable with the fastener 382 relative to the hanger assembly 382 so that the lamp assembly 308 is rotatable about a first axis A1 with the frame 370 and about a second axis A2 relative to the frame 370. In other configurations, the frame 370 can be rotatable relative to the fastener 382 and the hanger assembly 372.

The hanger assembly 372 includes a central body 384 and a pair of arms 386. An engaging member 390 is positioned at the end of each arm 386. The engaging members 390 are configured to engage a housing positioned inside of a support surface, such as a ceiling. The engaging members 390 can also be configured to engage other support structures, such as ceiling or wall studs. The position of the arms 386 can be adjusted to accommodate for different sized housings or openings.

Figure 12:
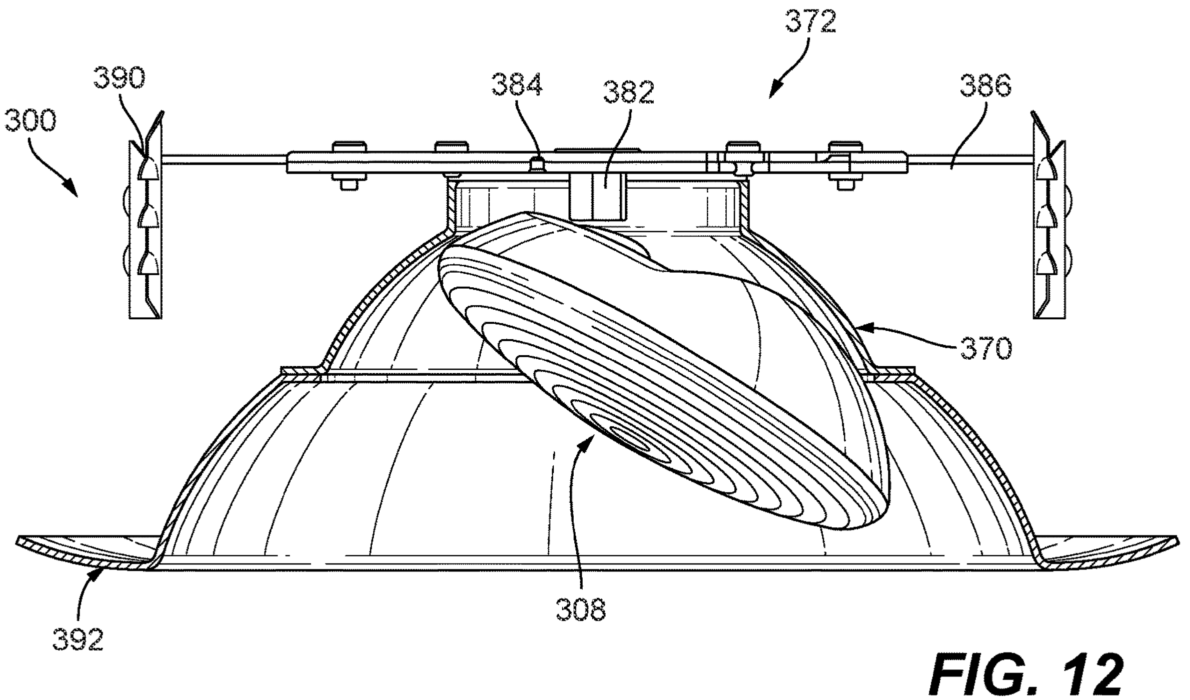
FIG. 12 is a side view of the light fixture of FIG. 11 with the frame and trim transparent.

When installed, the frame 370 can be connected to a piece of trim 392 that is configured to connect to and extend through a support surface such as a ceiling. As shown in FIGS. 12 and 14, the lamp assembly 308 can be entirely enclosed by the frame 370 and trim 392 even in a fully angled position.

Figure 15:
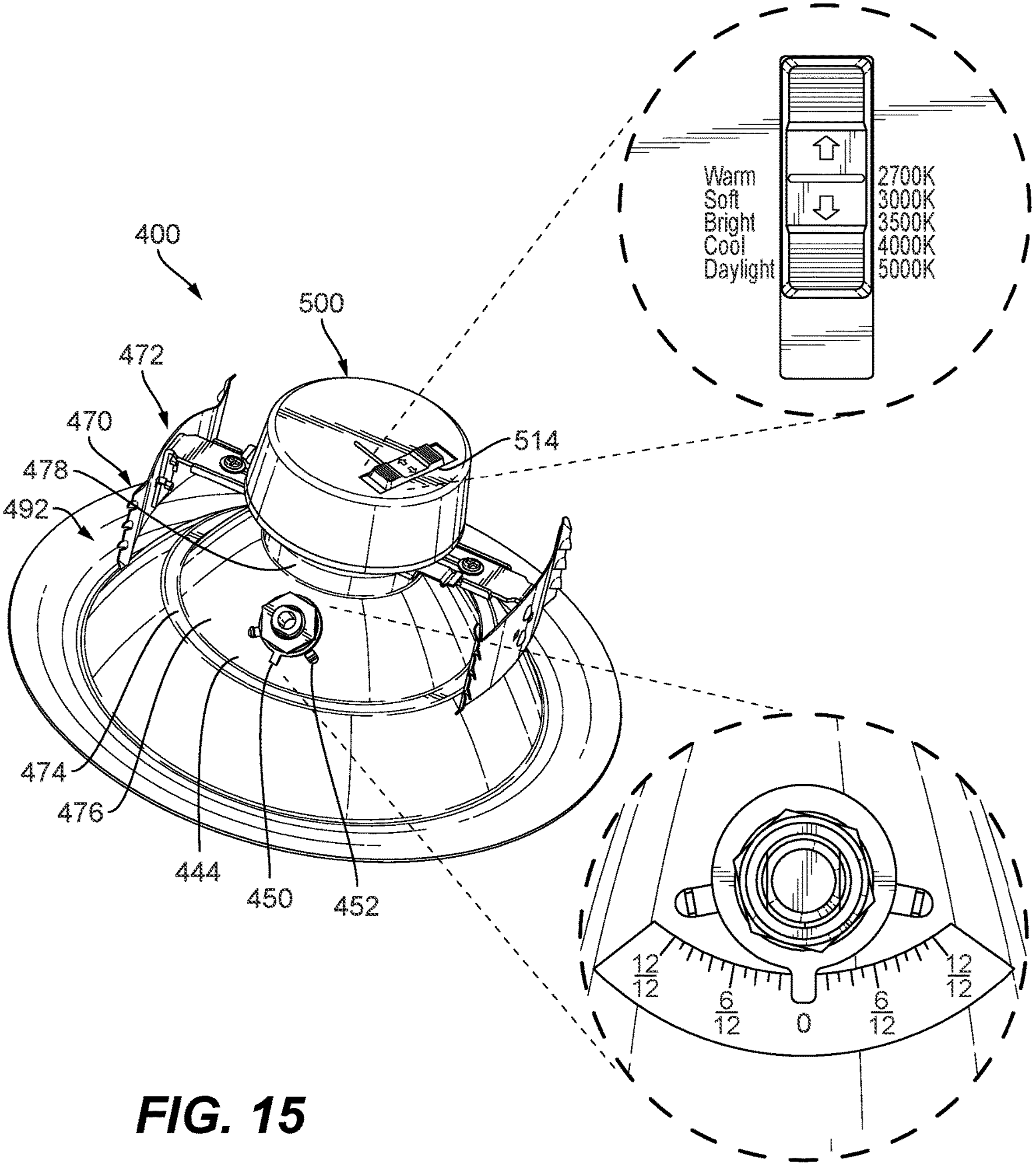
FIG. 15 is a top-perspective view an exemplary light fixture including a driver housing.
Figure 16:
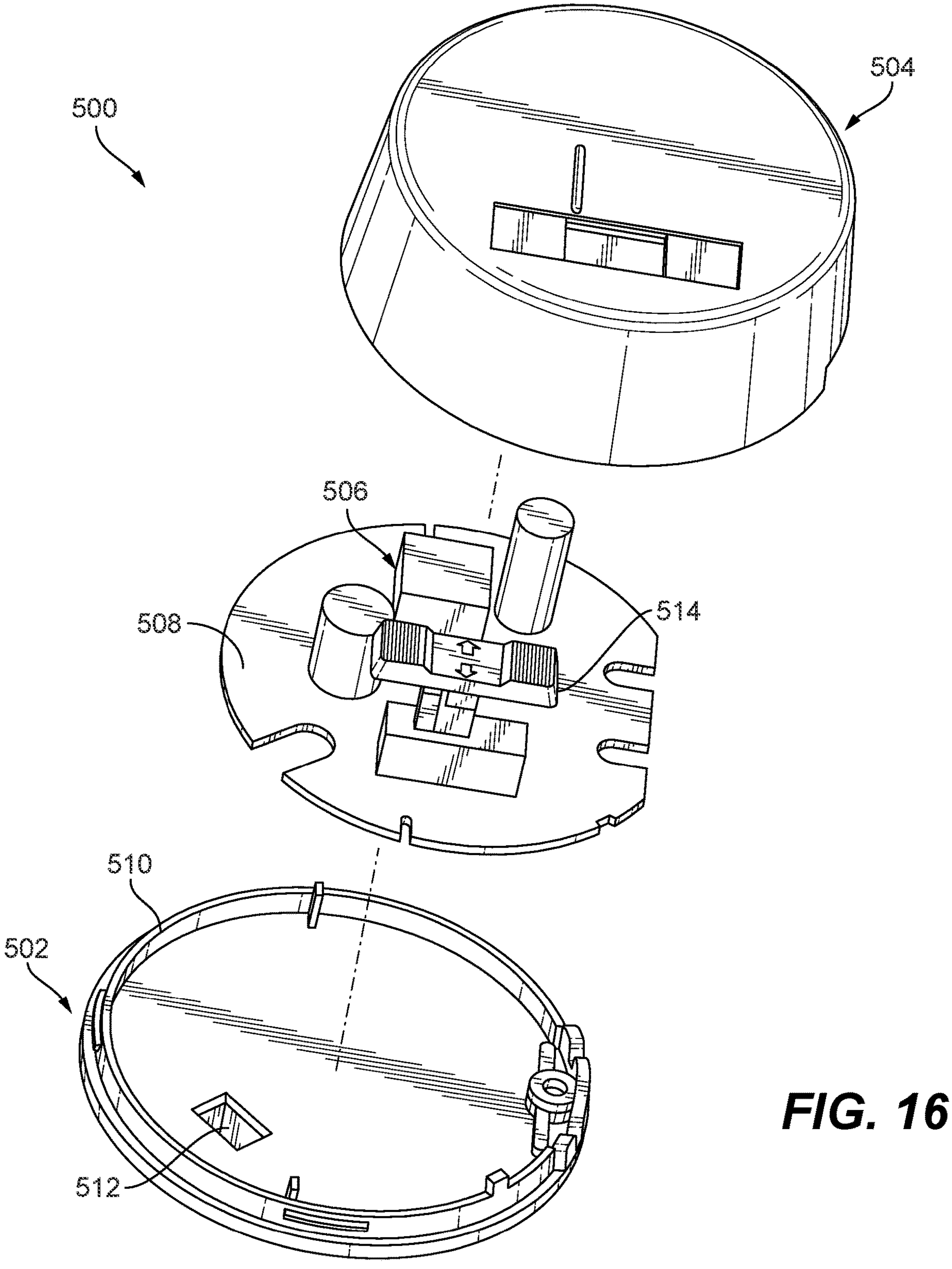
FIG. 16 is a perspective, exploded view of a driver housing.
Figure 17:
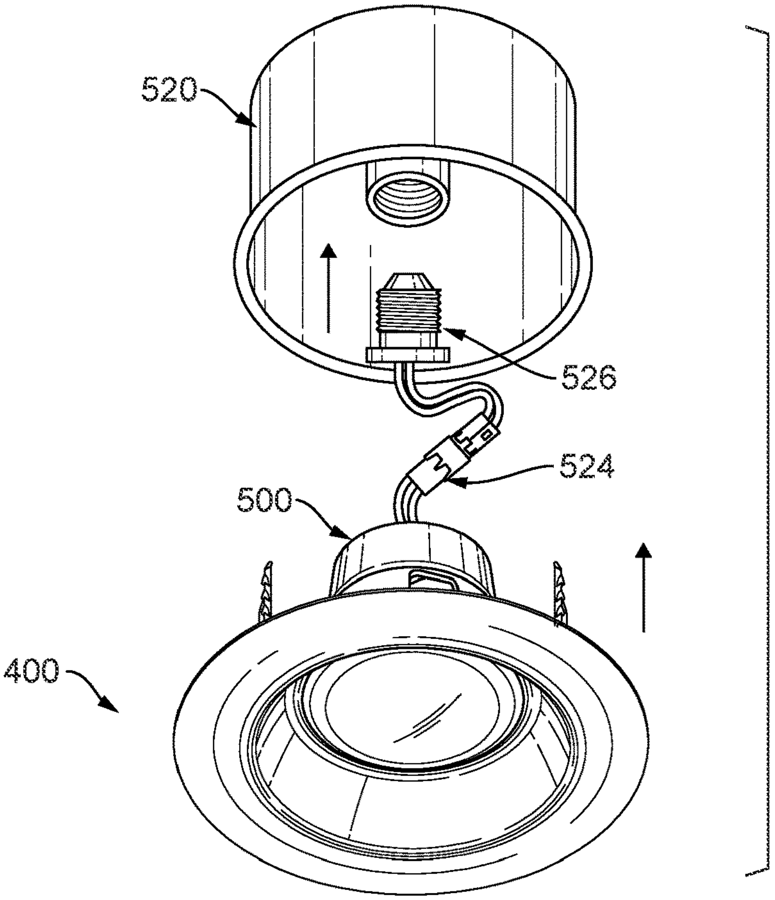
FIG. 17 is a bottom-perspective view of the light fixture of FIG. 15 being installed in a housing.

In certain embodiments, the light emitters used in the light fixture can be AC driven LEDs, such as driver on board or direct AC drive LEDs. In other embodiments, external components, such as one or more drivers, fuses, or other control components can be used to driver the LEDs. FIGS. 15-17 show an exemplary embodiment of a recessed light fixture 400 that utilizes a driver housing 500 to contain one or more control components to drive the light emitters. The light fixture 400 shares a number of similar components with the light fixture shown in FIGS. 11-14, with like reference numbers provided in the 400 series. The light fixture 400 incorporates a similar or identical lamp assembly, recessed frame 470 and a hanger assembly 472.

The recessed frame 470 includes a bottom flange 474, a spherical lower wall 476, a cylindrical upper wall 478, and a top wall. An opening is provided in the lower wall 476 to receive the pivot 444. Stops 452 are positioned on either side of the opening to limit rotation of the lamp assembly and the indicator 450. Markings or other indicators can be provided on the frame 470 to allow a user to accurately set the position of the indicator 450.

The driver housing 500 is connected to the top wall. The driver housing 500 can include a base 502 and a cover 504. The base 502 and the cover 504 combine to form a housing that contains one or more control components 506. The control components 506 can comprise a driver circuit that includes one or more electrical components (e.g., diodes, rectifiers, capacitors, etc.) that are configured to transform received AC power to DC and to smooth the power output provided to the light emitters. The control components 506 can be connected to a PCB 508 that is positioned on the base 502. The base 502 can include a rim 510 configured to receive the PCB 508 and one or more openings 512 to allow passage of conductors between the driver housing 500 and the light emitters. A selection switch 514 can be connected to one of the control components 506 and extend through the cover 504. As shown in FIG. 15, the selection switch 514 can be a color selection switch that is used to modify the correlated color temperature (CCT) of the light emitters.

Figure 18:
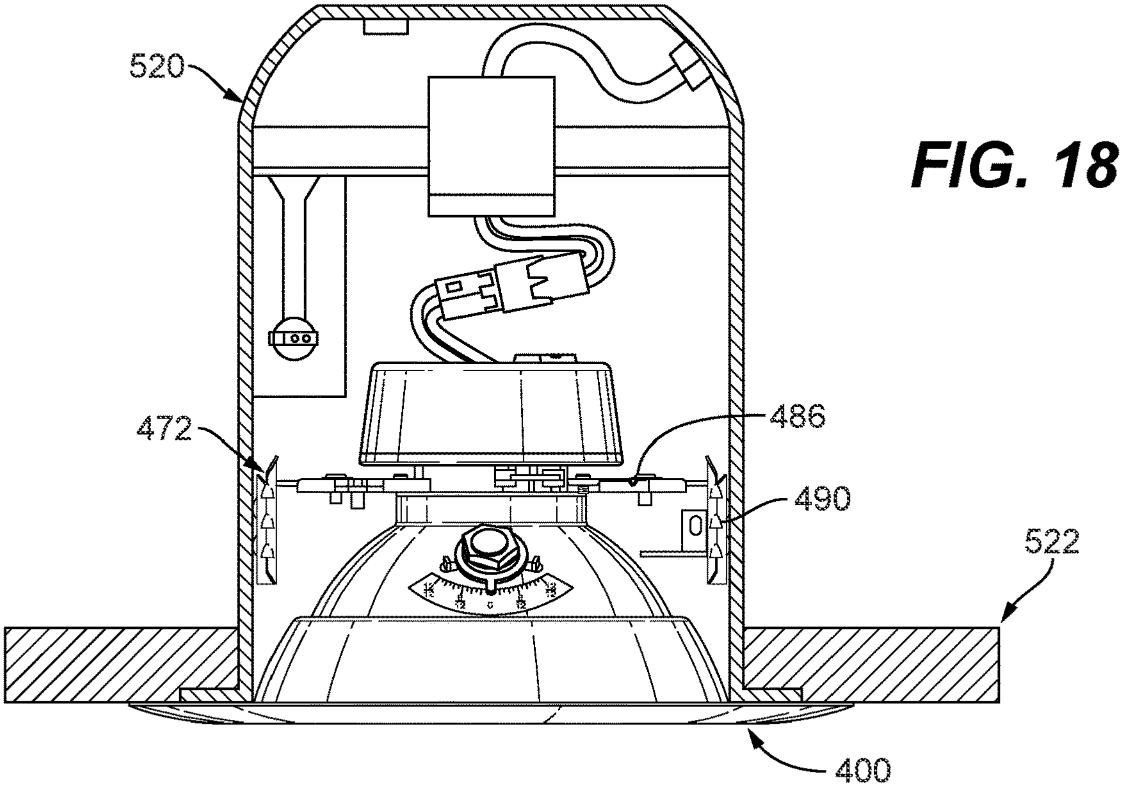
FIG. 18 is a sectional view of the light fixture of FIG. 15 installed in a housing.

FIGS. 17 and 18 show the light fixture 400 being installed into a housing 520. The housing 520 can be positioned in a support surface 522, for example a ceiling. A set of conductors 524 having a quick connector can extend from the driver housing The conductors 524 and quick connector can be mated with a corresponding connector that is connected directly to a main power supply or is connected to an adaptor 526 configured to fit a standard screw fitting.

The arms 486 of the hanger assembly 472 can be pushed in while the light fixture 400 is inserted in the housing 520. When released, the arms 486 are biased out so that the engaging member 490 engage the side of the housing 520, retaining the light fixture 400.

Figure 19:
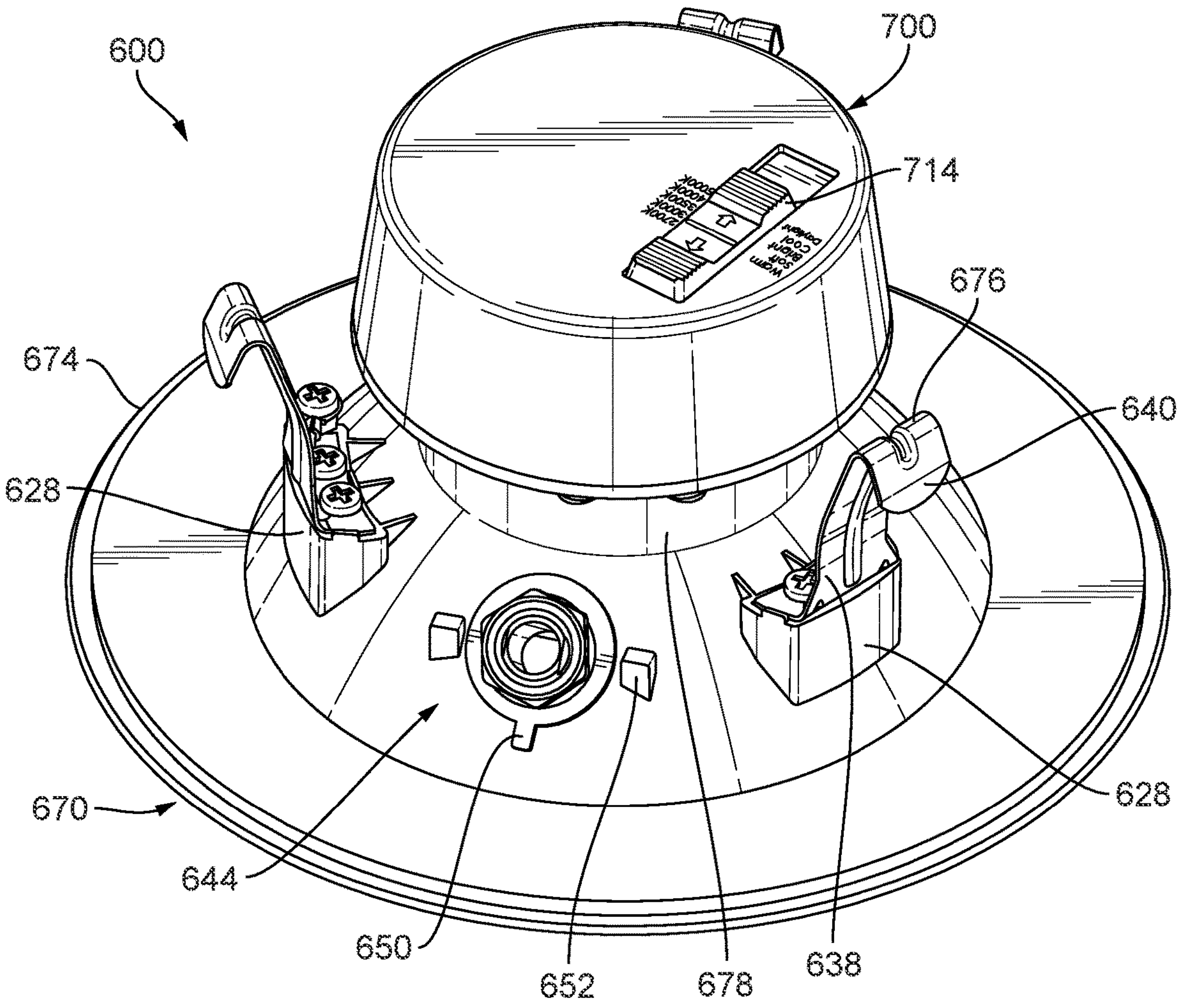
FIG. 19 is a top-perspective view of another exemplary light fixture.

FIG. 19 shows another embodiment of a recessed light fixture 600. The light fixture 600 shares a number of similar components with the light fixture shown in FIGS. 15-18, with like reference numbers provided in the 600 series. The light fixture 600 incorporates a similar or identical lamp assembly, recessed frame 670, and driver housing 700. The light fixture 600 can be configured to fit into smaller diameter openings, for example a four-inch opening.

The recessed frame 670 includes a bottom flange 674, a spherical lower wall 676, a cylindrical upper wall 678, and a top wall. An opening is provided in the lower wall 676 to receive the pivot 644. Stops 652 are positioned on either side of the opening to limit rotation of the lamp assembly and the indicator 650.

One or more mounting supports 628 extend from the lower wall 676 away from the lamp assembly. Three mounting supports 628 are shown, although more or fewer mounting supports 628 can be used. In some aspects, a single continuous mounting support 628 with one or more openings can be used. The mounting supports 628 can receive one or more mounting hangers 638 that are configured to connect the frame 670 a housing, similar to the can housing 520 shown in FIGS. 17 and 18.

In certain aspects, the mounting hangers 638 include resilient hooks 640. The hooks 640 are resilient so that they can be squeezed toward one another and inserted through the central opening in a housing. The housing can include slots or internal projections configured to engage the hooks 640. The mounting hangers 638 can form a moveable connection between the frame 670 and the housing.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms “front,” “rear,” “upper,” “lower,” “upwardly,” “downwardly,” and other orientational descriptors are intended to facilitate the description of the exemplary embodiments of the present disclosure, and are not intended to limit the structure of the exemplary embodiments of the present disclosure to any particular position or orientation. Terms of degree, such as “substantially” or “approximately” are understood by those of ordinary skill to refer to reasonable ranges outside of the given value, for example, general tolerances associated with manufacturing, assembly, and use of the described embodiments. Unless specified or limited otherwise, the terms “mounted,” “connected,” “supported,” and “coupled” and variations thereof are used broadly and encompass both direct and indirect mountings, connections, supports, and couplings.

What is claimed:

1. An adjustable light fixture comprising:

a frame configured to connect to a support; and a lamp assembly connected to the frame, the lamp assembly including a housing, a light emitter connected to the housing, and a lens connected to the housing;

wherein the frame is configured to be rotatably connected to the support about a first axis and the lamp assembly is rotatably connected to the frame about a second axis offset from the first axis; and wherein the first axis and the second axis intersect the lamp assembly in all rotational positions of the frame and all rotational positions of the lamp assembly.

2. The adjustable light fixture of claim 1, wherein:

a pivot fastener is fixed relative to the housing and rotatably connects the lamp assembly to the frame;

the second axis extends through the pivot fastener; and the pivot fastener and the housing rotate together relative to the frame.

3. The adjustable light fixture of claim 2, wherein the pivot fastener includes a bolt having a hollow shaft and further comprising an indicator connected to the pivot fastener.

4. The adjustable light fixture of claim 1, wherein the lamp assembly is directly connected to the frame.

5. The adjustable light fixture of claim 1, wherein the frame includes a circumferential edge configured to engage an exposed position of a surface of the support.

6. An adjustable light fixture comprising:

a frame configured to connect to a support, the frame having a surface with a first side and a second side;

a mounting hanger connected to the first side of the frame and extending away from the frame, the mounting hanger configured to connect the frame to the support;

a lamp assembly connected to the frame via a fastener that extends through the surface, the lamp assembly including a housing, a light emitter connected to the housing, and a lens connected to the housing, the lamp assembly rotatably connected to the frame about a first axis.

7. The adjustable light fixture of claim 6, wherein the surface is curved and forms a cavity on the second side, the housing is received at least partially within the cavity.

8. The adjustable light fixture of claim 6, wherein the mounting hanger includes a body with a first end and a second end, the first end includes a first section that extends along the first side, and the second end extends away from the first end and includes a hook.

9. The adjustable light fixture of claim 6, wherein:

the fastener is a pivot fastener that is fixed relative to the housing and rotatably connects the lamp assembly to the frame;

the first axis extends through the pivot fastener; and the pivot fastener and the housing rotate together relative to the frame.

10. The adjustable light fixture of claim 6, wherein the mounting hanger includes a body having an S-shape with a first end and a second end, the first end includes a mounting feature for connecting the mounting hanger to the frame, the second end extends away from the first end and is configured to resiliently move relative to the first end.

11. The adjustable light fixture of claim 6, wherein the mounting hanger is a first mounting hanger, the adjustable light fixture further comprises a second mounting hanger connected to the first side of the frame and extending away from the frame, wherein the frame is configured to be rotatably connected to the support about a second axis that extends from the surface and passes between the first mounting hanger and the second mounting hanger.

12. The adjustable light fixture of claim 11, wherein the first axis is offset from the second axis, and wherein the first axis intersects the second axis at all rotational positions of the lamp assembly.

13. The adjustable light fixture of claim 6, wherein the mounting hanger includes a cantilever portion having a fixed end connected to the frame and a free end movable relative to the fixed end.

14. An adjustable light fixture comprising:

a frame configured to be positioned adjacent to an opening in a support, the opening defining a first axis extending through the opening and a surface of the frame;

a lamp assembly connected to the frame, the lamp assembly including a housing, a light emitter connected to the housing, and a lens connected to the housing; and a pivot rotatably connecting the lamp assembly to the frame, wherein the lamp assembly is rotatable about a second axis that extends through the surface and is offset from the first axis.

15. The adjustable light fixture of claim 14, further comprising an indicator connected to a pivot fastener of the pivot, wherein the indicator is keyed to the pivot fastener and the pivot fastener is keyed to the lamp assembly.

16. The adjustable light fixture of claim 14, wherein the pivot extends through the lamp assembly and the frame.

17. The adjustable light fixture of claim 14, wherein the lamp assembly is directly connected to the frame.

18. The adjustable light fixture of claim 14, wherein the surface is curved and forms a cavity, the housing is received at least partially within the cavity.

19. The adjustable light fixture of claim 14, wherein:

a pivot is fixed relative to the housing;

the second axis extends through the pivot; and the pivot fastener and the housing rotate together relative to the frame.

20. The adjustable light fixture of claim 14, wherein the pivot includes a fastener with a curved surface and a planar surface, the fastener is keyed to the lamp assembly and configured to rotate with the lamp assembly relative to the frame.

* * * * *